United States Patent
Eibert

(10) Patent No.: US 7,490,449 B1
(45) Date of Patent: Feb. 17, 2009

(54) METHOD AND APPARATUS FOR MAKING DUNNAGE

(76) Inventor: Ralph Eibert, 11 Yuma La., Ringwood, NJ (US) 07456

( * ) Notice: Subject to any disclaimer, the term of this patent is extended or adjusted under 35 U.S.C. 154(b) by 0 days.

(21) Appl. No.: 11/891,694

(22) Filed: Aug. 13, 2007

(51) Int. Cl.
B65B 9/02 (2006.01)
B65B 31/06 (2006.01)

(52) U.S. Cl. .............................. 53/79; 53/403; 53/512; 53/553; 493/967

(58) Field of Classification Search ............... 53/432, 53/433, 434, 403, 79, 510, 511, 512; 493/967, 493/239, 313, 314
See application file for complete search history.

(56) References Cited

U.S. PATENT DOCUMENTS

| | | | |
|---|---|---|---|
| 3,254,828 A | 6/1966 | Lerner | |
| 3,298,156 A | 1/1967 | Lerner | |
| 3,477,196 A | 11/1969 | Lerner | |
| 3,703,430 A * | 11/1972 | Rich | 156/497 |
| 4,384,442 A * | 5/1983 | Pendleton | 53/554 |
| 4,576,669 A | 3/1986 | Caputo | |
| 5,188,691 A | 2/1993 | Caputo | |
| 5,203,761 A | 4/1993 | Reichental et al. | |
| 5,660,662 A * | 8/1997 | Testone | 156/145 |
| 5,679,208 A * | 10/1997 | Sperry et al. | 156/515 |
| 5,942,076 A * | 8/1999 | Salerno et al. | 156/359 |
| 6,341,473 B1 | 1/2002 | Kovacs et al. | |
| 6,460,313 B1 * | 10/2002 | Cooper | 53/79 |
| 6,550,229 B2 * | 4/2003 | Sperry et al. | 53/568 |
| 6,659,150 B1 * | 12/2003 | Perkins et al. | 156/378 |
| 6,889,739 B2 | 5/2005 | Lerner et al. | |
| 6,948,296 B1 | 9/2005 | Lerner et al. | |
| 7,165,375 B2 * | 1/2007 | O'Dowd | 53/96 |
| 7,225,599 B2 * | 6/2007 | Sperry et al. | 53/403 |
| 2005/0188659 A1 * | 9/2005 | Lerner et al. | 53/469 |

* cited by examiner

Primary Examiner—Paul R Durand
(74) Attorney, Agent, or Firm—Jaime A. Siegel

(57) ABSTRACT

An apparatus for manufacturing dunnage including a plurality of rollers for pulling a web of material through the machine, a nozzle with at least one port through which gas or liquid flows, a plurality of ceramic elements in opposing positions such that the web of material can pass between the plurality of ceramic elements. A heating element is routed through each of the plurality of ceramic elements such that heat will radiate through openings in the top surfaces of the ceramic elements that will melt the portion of the material that is passing between the opposing ceramic elements. The apparatus may be equipped to manufacture multiple pieces of dunnage simultaneously.

4 Claims, 7 Drawing Sheets

METHOD AND APPARATUS FOR MAKING DUNNAGE

FIELD OF INVENTION

The invention relates to an improved process for producing dunnage, or "air pillows."

BACKGROUND OF THE INVENTION

Various materials are used to insulate goods from shock during shipping. Solid materials such as polystyrene "peanuts," cups and "worms," pellets of foam rubber, plastics and expanded polyurethane foam are in common use as a shock protector. Air cushioning material, or "air pillows," are generally preferred over the above types of dunnage because it is lighter in weight, can be supplied and dispensed in a controlled manner, and can be manufactured on site. Air Pillows are typically manufactured using rolls of sheet material, which is also easier to dispose of than the individual pieces of plastic dunnage after the product is removed.

Air pillows are typically manufactured on site because it is inefficient to ship preformed air pillows since they take up considerably more volume than the sheet material. Various devices have been described to produce sealed air dunnage, or air pillows, from sheet material. U.S. Pat. Nos. 5,188,691, 5,203,761, and 4,576,669 all propose devices for producing air filled dunnage, typically bubble wrap, from plastic sheets on an "on demand" basis.

U.S. Pat. Nos. 6,341,473, 6,889,739 and 6,948,296 each disclose a process for producing dunnage on site from plastic sheets where the plastic sheets are sealed after inflation using heating elements that contact the plastic sheets and weld them together.

However, these aforementioned processes and devices are disadvantageous in that because the heating elements must directly physically contact the plastic sheeting, they can become fouled from plastic that melts when the plastic sheeting stops moving through the devices. When heating elements become fouled, the dunnage producing machines must be cleaned or the heating elements must be replaced, resulting in down time and lost production. It is a further disadvantage that the aforementioned processes and devices are limited in their production speeds because of the need to allow the air pillow material to be physically melted between the heating elements to seal the air pillows, and because when the heating elements are fouled, speeds must be slower. Current air pillow producing machines run at speeds between 18-40 feet per minute.

Another feature of existing dunnage machines are the use of two rubber wheels that engage the plastic sheeting to pull it through the inflation and sealing process. However the use of rubber wheels is disadvantageous because when the rubber wheels get dirty, slippage in the pillow material can occur.

SUMMARY OF THE INVENTION

It is therefore an object of the invention to produce air pillows on site in a manner that doesn't require heating elements to directly contact the air pillows to weld shut the air pillows.

It is a further object of the invention to produce air pillows on site by a process whereby the welding of the air pillow material is performed using a ceramic element that transmits heat from a heating element.

It is a further object of the invention to utilize an element, to transmit heat generated by a heating element that quickly dissipates its retained heat when the heating element is turned off.

It is a further object of the invention to produce air pillows on site by a process that seals the air pillows at improved operating speeds.

It is a further object of the invention to produce air pillows with an improved seal.

To achieve these and other objects, the present invention provides a method for producing air pillows comprising the steps of providing, in roll form, a plurality of preformed plastic bags, where each of said bags comprise plastic sheets stacked upon one another and sealed along its edges except for a channel passing between the layers and open on opposite ends, the bags being removably attached in sequence along two opposed edges, inserting a tube into the open channel and blowing air through the tube causing each bag to inflate in sequence, and sealing the channel of each inflated bag to create an air pillow.

Typically, a roll of bags will be provided which is segmented longitudinally, but a roll can also be provided which is segmented both longitudinally and laterally, to produce a roll with, for example, four bags across or eight bags across. The bags can be separated from the roll individually or can be separated in groups. This is advantageous, as the air pillows which are produced can be wrapped around an object to protect it.

In accordance with the invention, the sealing of the open channel is accomplished using by passing the plastic over a ceramic element through which a heating element passes so that the layers of plastic melt and are welded to one another. By using a ceramic element with a heating element passing through it, the heating element never directly contacts the plastic and when the heating element is shut off, the heat dissipates quickly from the ceramic element. Further, the ceramic element is offset from the plane on which the plastic travels so that the ceramic element does not contact the plastic during operation. The heating element can be set to shut off as soon as the plastic stops moving, so that the ceramic elements dissipates its heat quickly, preventing static plastic from melting on and fouling the ceramic elements. As the ceramic element does not get fouled with melted plastic or plastic residue, the welding can occur at a higher rate than if the welding were done using heating elements that directly contacted the plastic. This technology will allow operating speeds that are almost 100-800% higher than existing machines.

Various types and thicknesses of material can be used to make the bags of the invention. The thickness of the material can be adjusted to provide extra strength or lighter weight, depending on which properties are desired.

Importantly, the apparatus used to inflate and seal plastic bags is well known and easy to operate. Typically, an air filled sealed bag will be used for packaging a small article. In this regard, U.S. Pat. Nos. 3,254,828, 3,298,156 and 3,477,196 are cited as representative patents showing methods and apparatus for blowing open bags on rolls.

In an additional embodiment of the invention, a metal knurled wheel is engaged with second wheel, possibly made of rubber, such that the plastic sheet material is pulled through the dunnage machine and the inflation and welding process. The welded seal can optionally be run directly between the knurled and second wheel to enable the knurled pattern to be embossed in the welded seal, thereby strengthening it.

These and other objects, advantages and features of the invention will become apparent to those skilled in the art upon consideration of the following description of the invention.

DETAILED DESCRIPTION OF THE INVENTION

Figure 1:
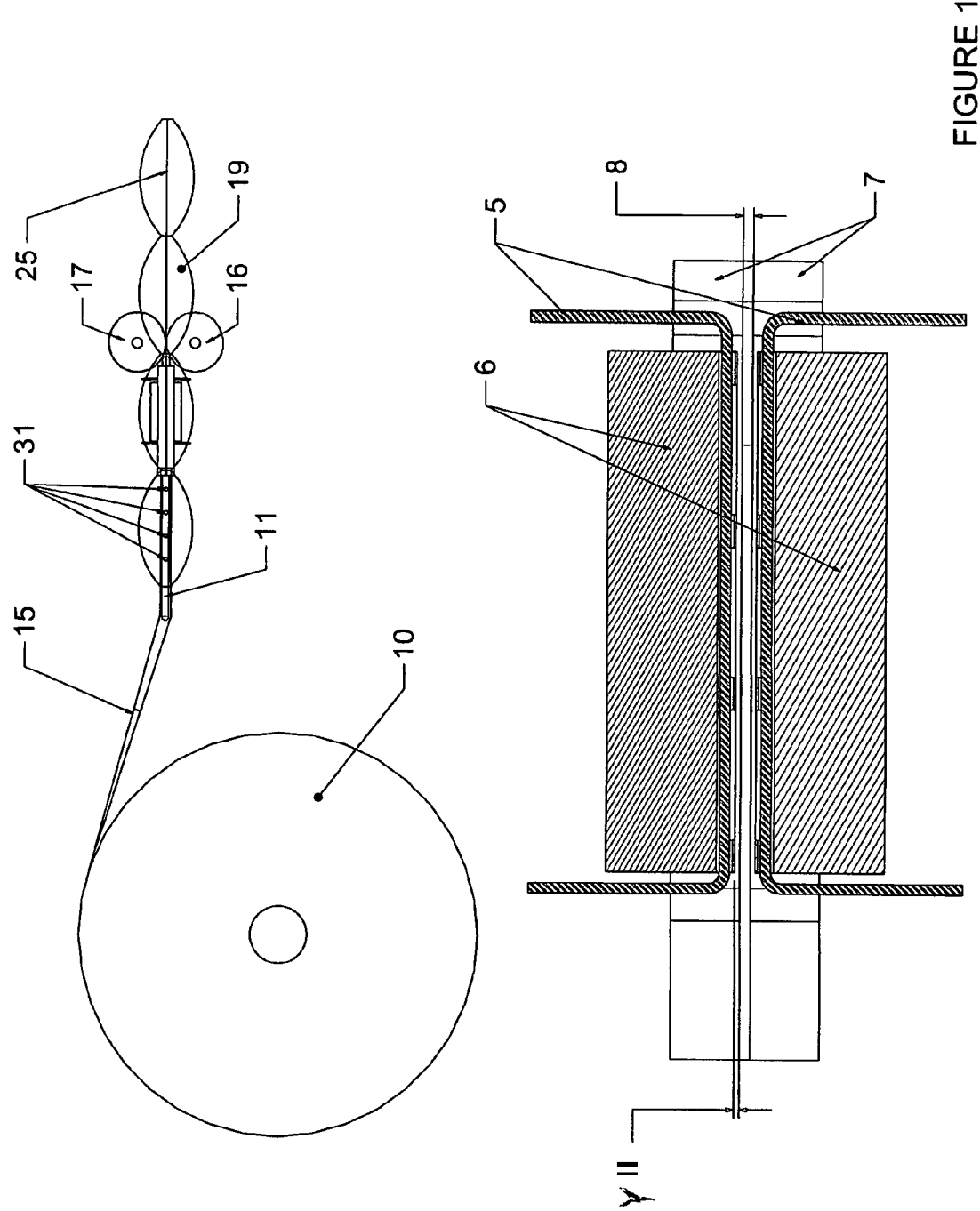
FIG. 1 a process flow for forming inflated dunnage.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. While the following description describes a dunnage formation system, it should be recognized the embodiments disclosed can be utilized to manufacture pouches filled with any aqueous or gaseous material. In the description below, like reference numerals are used to describe the same, similar or corresponding parts in the several views of the drawing.

Figure 2:
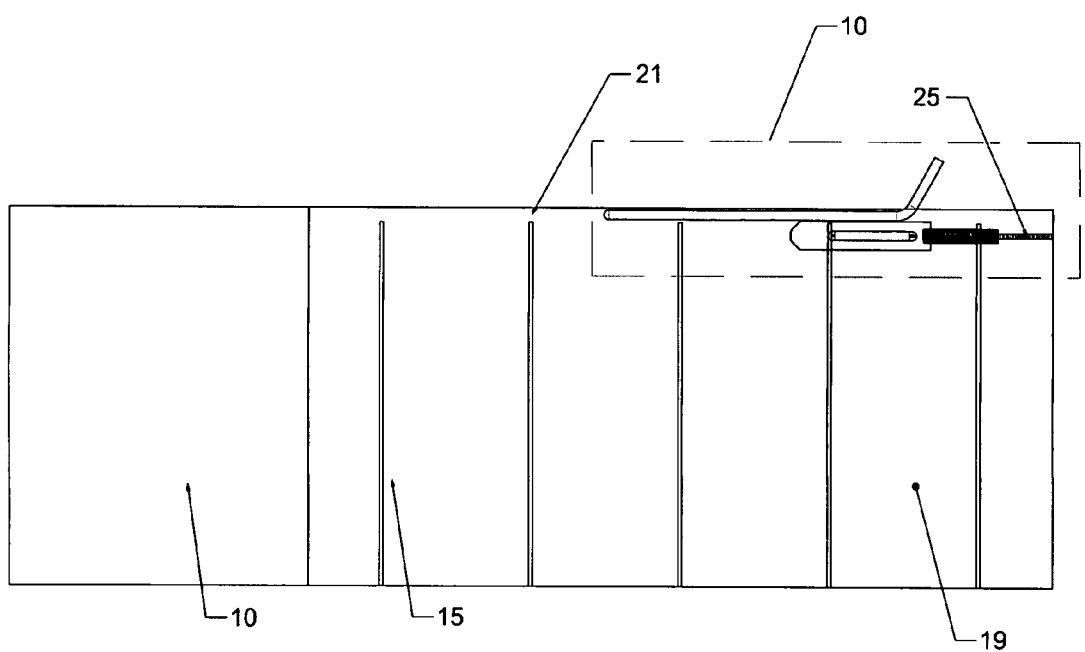
FIG. 2 is a plan view of device for forming inflated dunnage.

Referring now to the drawings and FIGS. 1 and 2 in particular, the process flow of a dunnage formation machine is shown. A web of plastic material 15 such as polypropylene is provided on a spool 10. The web is segmented longitudinally as shown in FIG. 2. The machine includes heating elements 5 that pass through two ceramic elements 6. The ceramic elements 6 are mounted in mounts 7. In one embodiment, the heating elements could be made of a nickel chromium wire with a 0.025 inch diameter, although any number of materials could be used as the heating element as long as it provides sufficient heat to melt the web 15. The mounts are positioned so that there is a gap 8 between them so that the web 15 passes between them. The gap 8 can be adjusted depending on the thickness of the plastic material. The ceramic elements 6 are offset from the surface plane of the mount along which the web 15 passes so that the ceramic elements do not come into contact with the web 15. The ceramic elements 6 are offset Y inches from the plane of their respective mounts 7. In one embodiment, the offset is 0.020 inches, although other offsets can be used, and it would be possible for the ceramic elements to not be offset. Air nozzle 11 is mounted on the machine to inflate the dunnage 19 as the web 15 passes through the machine.

Figure 4:
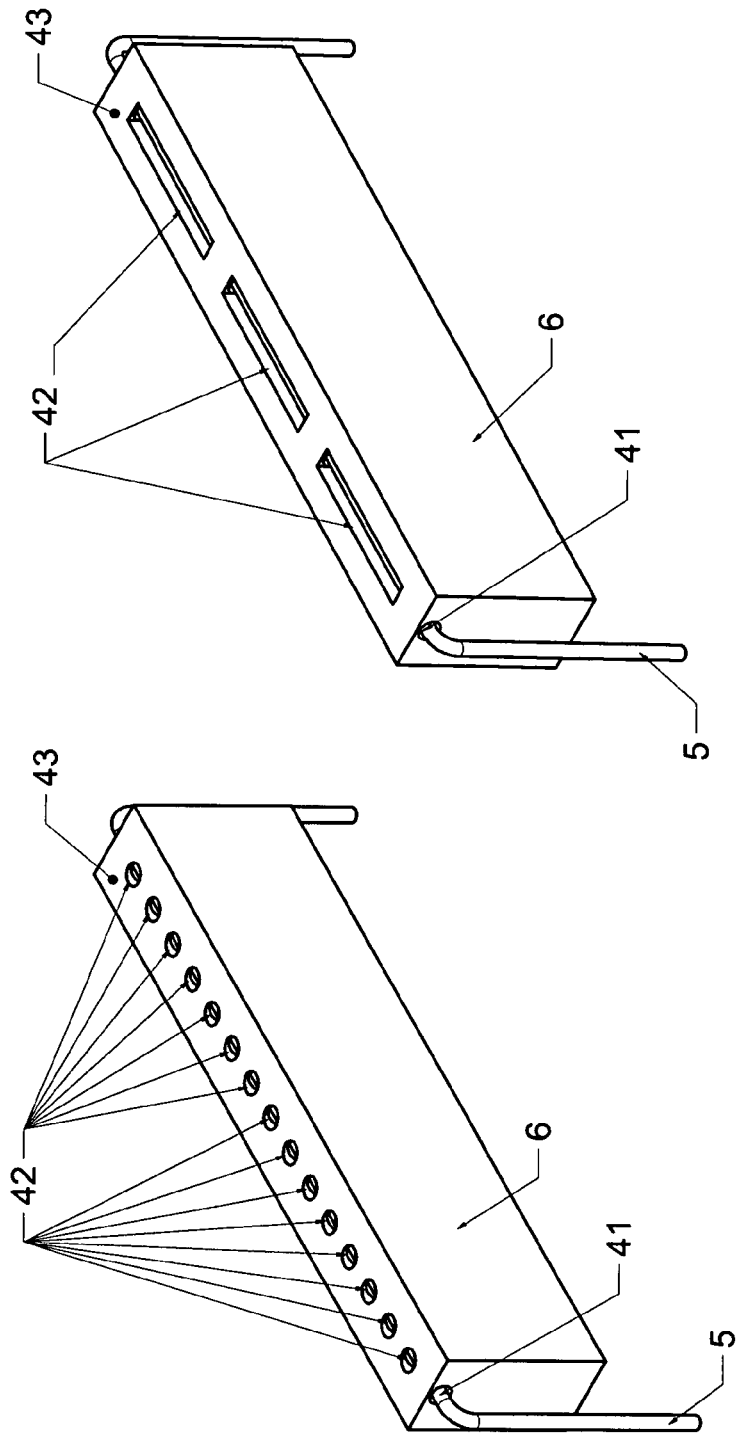
FIGS. 4a-b are views of the ceramic element.

When the machine is in use, pulley wheels 16 and 17 rotate to pull the web 15 from the spool of plastic material 10. Heating elements 5 pass through the ceramic elements and generate heat. The ceramic elements 6 are insulators and therefore heat with an intensity to melt the plastic will only occur where there are openings in the ceramic elements 6. FIGS. 4a and 4b show various configurations of the ceramic elements 6 and the openings 42 in them. In one embodiment, the ceramic elements are made of an electrical-insulating boron-nitride ceramic material, although many other ceramic materials compositions could be used. The web 15 passes over a guide roll 12 and thence to the air nozzle 11 where the air nozzle 11 is positioned to be inserted into a portion 21 of the web 15 that is not completely sealed on the longitudinal edges of the non-inflated dunnage 19. The air nozzle allows compressed air to blow in between the layers of the web 15, thereby inflating a segmented portion of the web 15. The now inflated web 15 is fed through the interface of the mounts 7 holding the ceramic elements 6 whereby layers of the web 15 are melted and welded shut by the heat passing through the openings 42 in the ceramic elements 6. Consequently, the layers of the plastic material of the web will be welded together to create a seam 25 in the now inflated web 15. Once the web 15 has been sealed, it is cut off of the air nozzle 11 by trimming the web material that is not part of the inflated portion of the web 15 or the seam 25. The seam 25 of the now inflated web 15 then passes through the pulley wheels 16 and 17. Either one or both of pulley wheels 16 and 17 are driven by a motor so that the web 15 is pulled through the machine. Inflated dunnage 19 is now the resulting product.

In practice the machine 10 will be housed within a cabinet which is not shown for clarity of illustration. The cabinet could include access doors with an electrical interlock. When the doors are open the machine may be jogged for set up, but the machine will not operate to produce dunnage units unless the doors are closed and latched.

In another embodiment, one or both of pulley wheels 16 and 17 are knurled wheels. In this manner, when the freshly created seam 25 passes through the interface between pulley wheels 16 and 17 pattern reflective of the knurled pattern is embossed on the still soft seam, thereby strengthening the seam.

Figure 3:
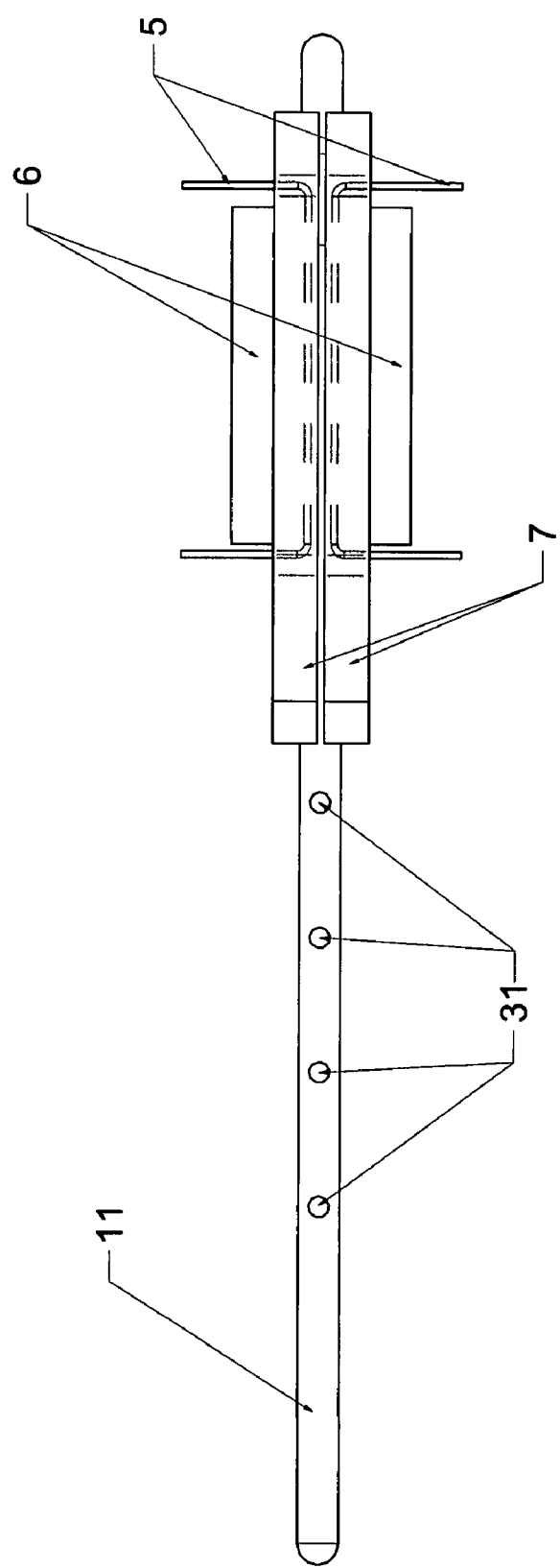
FIG. 3 is a plan view of a portion of the dunnage inflating machine.

Referring to FIG. 3, the relationship of the components of the dunnage producing machine is described. The heating elements 5 are routed through the ceramic elements 6 so that the heat from the heating elements 5 passes through openings 42 in the ceramic elements (shown in FIGS. 4a and 4b). The ceramic elements 6 themselves are excellent insulators and therefore do not generate much heat themselves. When the plastic web stops moving, it is no longer under tension, or is under lower tension and therefore the plastic web may sag and come to rest on the lower ceramic element. Consequently, when the plastic web stops moving, the heating elements 5 stop generating heat, and because the ceramic elements 6 are not themselves hot, the plastic web does not melt to the ceramic elements 6 when stopped, and therefore do not foul the ceramic elements 6 when the plastic web sags. Air nozzle 11 is shown with 4 ports 31 for distributing air into the web material, however, it will be recognized that many other arrangements may be used for passing the substance that will be used to inflate the web such as one port or more in a variety of shapes. As shown in FIG. 3, the air nozzle is roughly in the same plane as the interface between the ceramic elements 6 and between pulley wheels 16 and 17.

Referring now to FIGS. 4a and 4b the arrangement of the ceramic elements 6 are shown. The heating element 5, in the form of a wire for example, passes through port 41 in the side of the ceramic element 6. The ceramic element 6 includes openings 42 in its top surface 43 through which heat from the heating element will pass. The openings 42 can be rectangular, square, circular, or any shape. It is necessary that the distance between the heating element and the top surface 43 of the ceramic element 6 is such that the heat radiating through the openings 42 is sufficient to melt the layers of the plastic material 15 and to weld the layers together. The distance between the heating element 5 and the top surface 43 of the ceramic element 6 would be dependent on the amount of heat being generated by the heating element 5 and the melting point of the plastic material 15.

Figure 5:
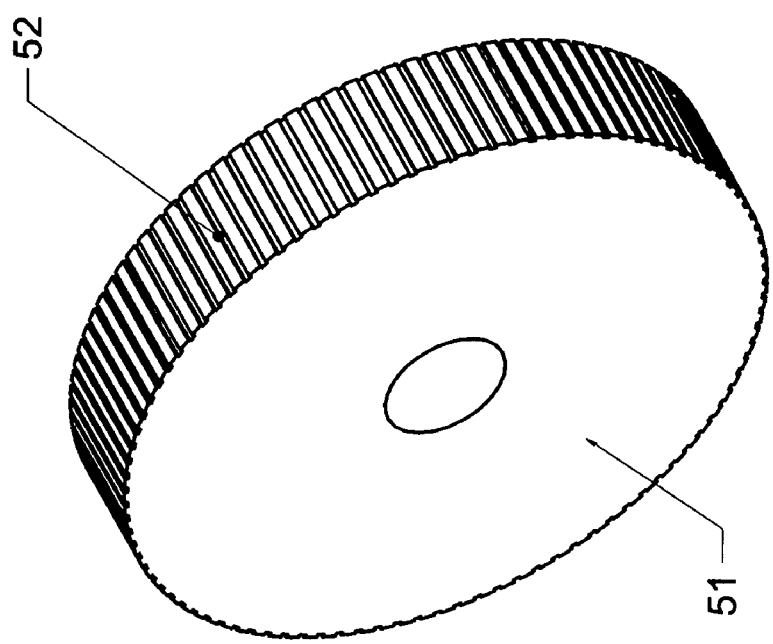
FIG. 5 is a detail view of a pulley wheel.

Referring now to FIG. 5, an embodiment of a pulley wheel 51 is shown having a knurled pattern 52. In the embodiment shown, knurled pattern 52 is a series of longitudinal grooves cut into the face of wheel. In one embodiment, pulley wheel 16 is made of rubber, and pulley wheel 17 is replaced by pulley wheel 51, which is made of metal and has knurled pattern 52 on its face. However, one or both of pulley wheels 16 and 17 could be made of metal with the knurled pattern 52, and the knurled pattern 52 could be made of any number of patterns. Pulley wheels 16 and 51 would be engaged in an interfering manner such that when one or both is driven it will pull web 15 through the interfering engagement and emboss the seam 25 with knurled pattern 52. In this manner, seam 25 will be made stronger, than if no knurled pattern was present on a pulley wheels.

Figure 6:
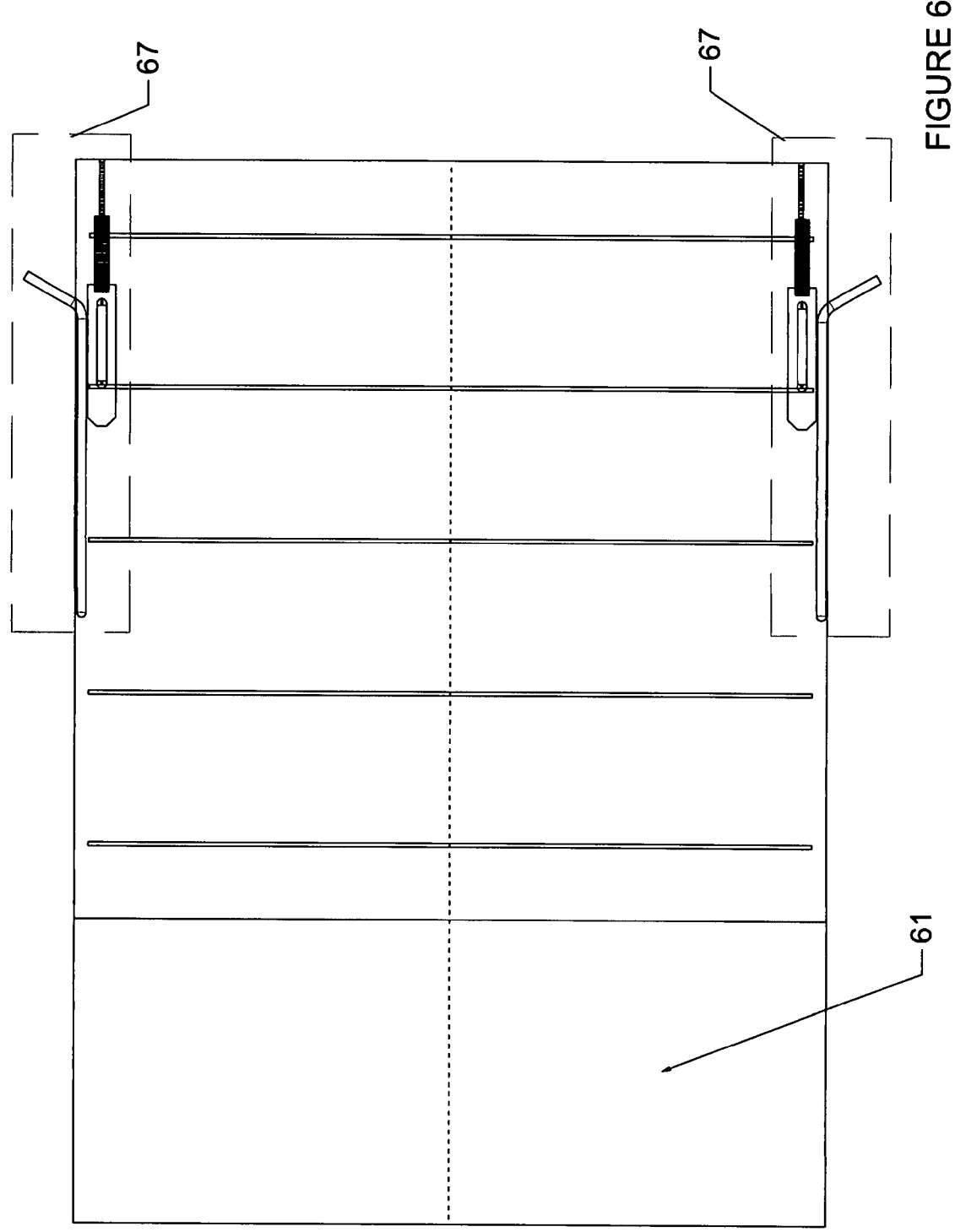
FIG. 6 is a view of a device for producing higher volumes of dunnage

Referring now to FIG. 6 an embodiment is shown where multiple pieces of inflated dunnage can be manufactured at the same time. In this embodiment, a spool of material 61 can be provided which is segmented both longitudinally and laterally, to produce a roll with, for example, two bags across. As shown in this embodiment, duplicative assemblies 67 of air nozzles, mounts, ceramic elements and heating elements are required such that the number of assemblies is equal to the number of inflated dunnage that are arranged laterally on the spool of material 61. For example, if it is desired to produce two inflated dunnage bags at the same time, a spool of material that is segmented with two bags laterally to each other will be run through a device that has two assemblies with two air nozzles 11, four mounts 7, four ceramic elements 6 and four heating elements 5 Alternatively, there could be an arrangement where there is a common seam between two longitudinally arranged bags, such that only one ceramic element assembly (with two mounts 7, two ceramic elements 5 and two heating elements 6) would be required.

Figure 7:
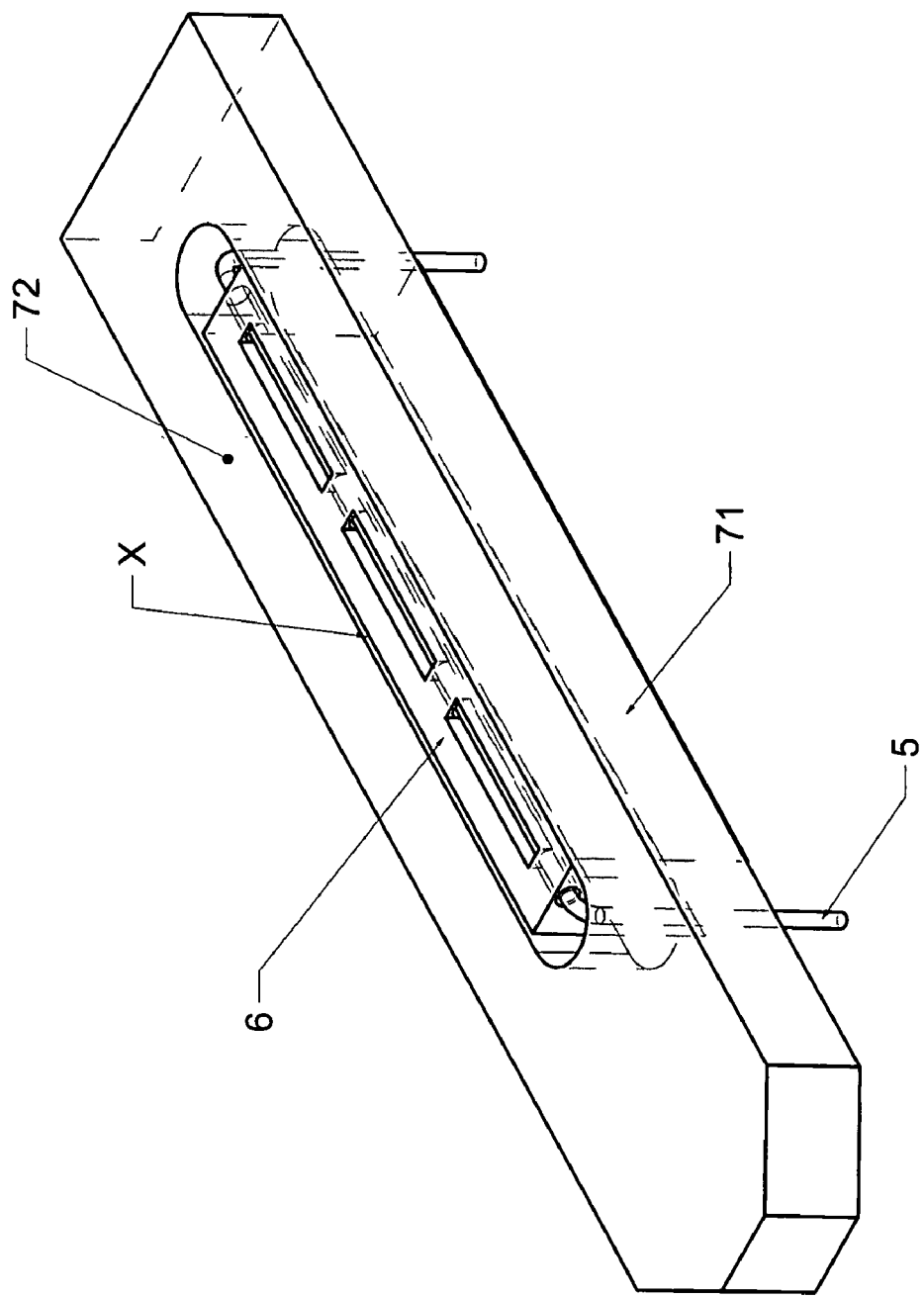
FIG. 7 is a view of the ceramic element in a fitting.

Referring now to FIG. 7, an embodiment is shown whereby the ceramic element 6 is mounted in a mounting element 71. The mounting element 71 is fixedly or removably attached to the dunnage machine. The ceramic element 6 could be offset X inches from the top surface 72 of mounting element 71 so that the plastic material 15 should not come into direct contact with the ceramic element 6 during machine operation.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. An apparatus for manufacturing dunnage comprising:
a plurality of rollers for pulling a web of material through the machine;
a nozzle with at least one port through which gas or liquid flows;
a plurality of ceramic elements mounted in opposing positions on the machine such that the web of material can pass between the ceramic elements;
the plurality of ceramic elements each having at least one opening on their opposing outer surfaces;
a heating element passing through each of the plurality of ceramic elements for generating heat that will radiate through the at least one opening on the opposing outer surfaces of the ceramic elements that will melt the portion of the material that is passing between the plurality of ceramic elements thereby creating a seam;
wherein the at least one opening in the opposing out surfaces of the ceramic elements are of mixed shapes.

2. An apparatus for manufacturing dunnage comprising:
a plurality of rollers for pulling a web of material through the machine;
a nozzle with at least one port through which gas or liquid flows;
a plurality of ceramic elements mounted in opposing positions on the machine such that the web of material can pass between the ceramic elements;
the plurality of ceramic elements each having at least one opening on their opposing outer surfaces;
a heating element passing through each of the plurality of ceramic elements for generating heat that will radiate through the at least one opening on the opposing outer surfaces of the ceramic elements that will melt the portion of the material that is passing between the plurality of ceramic elements thereby creating a seam;
wherein the at least one opening in the opposing out surfaces of the ceramic elements are round in shape.

3. An apparatus for manufacturing dunnage comprising:
a plurality of rollers for pulling a web of material through the machine;
a nozzle with at least one port through which gas or liquid flows;
a plurality of ceramic elements mounted in opposing positions on the machine such that the web of material can pass between the ceramic elements;
the plurality of ceramic elements each having at least one opening on their opposing outer surfaces;
a heating element passing through each of the plurality of ceramic elements for generating heat that will radiate through the at least one opening on the opposing outer surfaces of the ceramic elements that will melt the portion of the material that is passing between the plurality of ceramic elements thereby creating a seam;
wherein the at least one opening in the opposing out surfaces of the ceramic elements are rectangular in shape.

4. An apparatus for manufacturing dunnage comprising:
a plurality of rollers for pulling a web of material through the machine;
a nozzle with at least one port through which gas or liquid flows;
a plurality of ceramic elements mounted in opposing positions on the machine such that the web of material can pass between the ceramic elements;
the plurality of ceramic elements each having at least one opening on their opposing outer surfaces;
a heating element passing through each of the plurality of ceramic elements for generating heat that will radiate through the at least one opening on the opposing outer surfaces of the ceramic elements that will melt the portion of the material that is passing between the plurality of ceramic elements thereby creating a seam;
wherein the at least one opening in the opposing out surfaces of the ceramic elements are oval in shape.

* * * * *